United States Patent
Lipton et al.

(10) Patent No.: US 7,679,641 B2
(45) Date of Patent: Mar. 16, 2010

(54) VERTICAL SURROUND PARALLAX CORRECTION

(75) Inventors: Lenny Lipton, Los Angeles, CA (US); Bob Akka, Sausalito, CA (US)

(73) Assignee: Real D, Beverly Hills, CA (US)

( * ) Notice: Subject to any disclaimer, the term of this patent is extended or adjusted under 35 U.S.C. 154(b) by 479 days.

(21) Appl. No.: 11/400,915

(22) Filed: Apr. 7, 2006

(65) Prior Publication Data

US 2007/0236560 A1 Oct. 11, 2007

(51) Int. Cl.
*H04N 13/04* (2006.01)
*G06F 15/00* (2006.01)

(52) U.S. Cl. ......................................... 348/51; 345/419
(58) Field of Classification Search .................. 348/43, 348/51, 586, 700, 701, 512, 416, 416.1, 14.15, 348/52, 53, 47, 59, 42, 46, 79, 80, 56; 345/7, 345/8, 115, 419, 426, 434, 139, 420, 430, 345/433, 435, 125, 130, 582, 589, 156, 157
See application file for complete search history.

(56) References Cited

U.S. PATENT DOCUMENTS

| | | | | |
|---|---|---|---|---|
| 5,142,357 A | * | 8/1992 | Lipton et al. | 348/48 |
| 5,682,171 A | * | 10/1997 | Yokoi | 345/7 |
| 6,366,281 B1 | * | 4/2002 | Lipton et al. | 345/419 |
| 6,411,326 B1 | * | 6/2002 | Tabata | 348/47 |
| 6,636,220 B1 | * | 10/2003 | Szeliski et al. | 345/475 |
| 2001/0050756 A1 | * | 12/2001 | Lipton et al. | 353/15 |
| 2002/0105514 A1 | * | 8/2002 | Roche, Jr. | 345/419 |

OTHER PUBLICATIONS

International Preliminary Report on Patentability for PCT/US2007/008316 mailed Oct. 16, 2008.
International Preliminary Report on Patentability mailed Jun. 9, 2009.

* cited by examiner

*Primary Examiner*—Behrooz Senfi
(74) *Attorney, Agent, or Firm*—Baker & McKenzie LLP

(57) ABSTRACT

Three general designs for reducing parallax in a moving picture are disclosed. One design comprises stretching graphics content near the left and right frame edges of stereo pair elements in order to modify parallax settings. A second design comprises identifying a plurality of substantially corresponding points in a left eye view and right eye view and bringing the plurality of substantially corresponding points closer together using a morph technique. The third design entails fading a portion of a right eye view with a portion of a left eye view near or proximate an edge of the image.

20 Claims, 7 Drawing Sheets

VERTICAL SURROUND PARALLAX CORRECTION

BACKGROUND OF THE INVENTION

1. Field of the Invention

This present invention relates to displaying both plano-stereoscopic images and autostereoscopic images. More specifically, the present design relates to eliminating the conflict of cues that occurs at the vertical edges of the screen surround when objects having negative parallax values are partially occluded by the surround.

2. Description of the Related Art

Plano-stereoscopic images are images made up of a left and a right perspective image and are most often viewed using an individual selection device, or eyewear. Autostereoscopic images are defined as stereoscopic images that can be viewed without the use of an individual selection device as image selection takes place at the screen or display surface. While plano-stereoscopic imaging is predominantly discussed herein, a worker skilled in the art will be able to understand the changes that can be implemented to apply these teachings to autostereoscopic imaging.

Plano-stereoscopic or autostereoscopic images may be projected on a screen or viewed on a display monitor. Frequently such images may also be displayed as hard-copy using photomechanical reproduction. In the case of plano-stereoscopic images, the anaglyph is the frequently used viewing modality, where an anaglyph comprises images in contrasting colors that appear three-dimensional when superimposed over one another and viewed through eyewear using complimentary colors. In the case of autostereoscopic still images, a hardcopy can be achieved using an overlaid lenticular screen.

In order to understand the concept of vertical surround correction, one first needs to understand the concept of image parallax in a plano-stereoscopic or autostereoscopic display. Referring to FIGS. 1A through 1D, display surface 101 in these figures includes demonstrations made up of points with various parallax values to be viewed by an observer whose left eye is 104 and right eye is 105. The lines of sight of the eyes—which, for the purposes of this discussion, correspond to the optical axis of the eyes' lenses—are, for the left and right eyes, 102 and 103 respectively. The distance between left and right eyes 104 and 105 is known as the interpupillary distance, given by line 106.

In FIG. 1A, the left and right image points on display surface 101 are given by point 107 that is made up of superimposed left and right image points. These left and right image points correspond or overlap and this condition is known as "zero parallax." Such an image point will appear at the plane of the display surface 101, and the eyes tend to converge inwardly to fuse point 107 so that lines of sight 102 and 103 cross at point 107.

Zero-parallax points appear at the plane of the screen (FIG. 1A), positive-parallax points appear behind the plane of the screen (FIG. 1B), and negative-parallax points appear in front of the screen (FIG. 1C). Beyond certain values the image becomes uncomfortable to view (FIG. 1D), or because of system constraints undesirable artifacts appear which contribute to difficulty in viewing the stereoscopic image. The concept of the breakdown of accommodation and convergence is an important one for stereoscopic displays and has an impact on the problem addressed here. In the real world, the eyes will both focus (or accommodate) and converge on objects in space in synchrony. Such focusing is a habitual or learned response, because the neurological pathways for accommodation and for convergence are separate. When looking at stereoscopic displays, the eyes will remain focused at the plane of the display, but convergence varies for various points dependent upon parallax values. This can produce stress or discomfort or what people sometimes call "eyestrain."

In the case of the display shown in FIG. 2A, object 205 (represented by 205L and 205R in the left and right halves of the stereo pair respectively) has negative parallax. Object 206 (represented by 206L and 206R in the left and right halves of the stereo pair respectively), has positive parallax. Note that portions of object 205 (205 is meant to represent a complete rectangle) are cut off by the left vertical edges of the screen surround 203. In such a case the eye-brain will perceive that the image is trying to come off-screen because of the stereoscopic or parallax cue. However, the eye-brain also perceives a conflict of cues because the screen surround, or that portion of the stereo window at 203, also provides an important depth clue, namely one of interposition, tells the observer that the object must be behind the plane of the screen. In other words, a near object (element 205, having negative parallax) seems to be blocked by something that is farther away (the screen surround at zero parallax). This confusing condition is called a "conflict of cues," and is to be avoided. To some people the result is perceived as a blur, to others it's merely uncomfortable, and to others the image does not seem to be coming off the screen as was intended, but gets pushed back into the screen. This imaging artifact never occurs in the visual world so people have no ready way to articulate what is being seen.

The present design seeks to cure the problem of the screen surround cue conflicts and thereby increase the enjoyment of perceiving a stereoscopic image. It would be advantageous to offer a design that can address parallax or stereoscopic cue conflicts in both large and small screen environments, particularly a design that offers benefits over that previously available.

SUMMARY OF THE INVENTION

According to one aspect of the present design, there is provided a method for providing enhanced image viewing for a left frame and a right frame of a stereo pair. The left frame comprises left frame content and the right frame comprises right frame content. The method comprises, proximate one edge of the image pair, shifting left eye content laterally relative to right eye content. The lateral shifting tends to shift negative parallax elements toward positive parallax.

According to another aspect of the present design, there is provided a method of providing enhanced image viewing of a right eye view and a left eye view of a stereo pair. The method comprises identifying a plurality of substantially corresponding points in the left eye view and the right eye view and bringing the plurality of substantially corresponding points together by morphing the left eye view and the right eye view together proximate an edge of at least one of the left eye view and the right eye view based upon the plurality of substantially corresponding points. The bringing together reduces parallax effects of the stereo pair toward zero parallax at the edge.

According to a further aspect of the present design, there is provided a method of providing enhanced image viewing of a right eye view and a left eye view of a stereo pair. This method comprises cross fading portions of the left eye view and right eye view approaching the left and right image edges to reduce or eliminate parallax effects near image edges.

These and other advantages of the present invention will become apparent to those skilled in the art from the following detailed description of the invention and the accompanying drawings.

DETAILED DESCRIPTION OF THE INVENTION

Figure 1A:
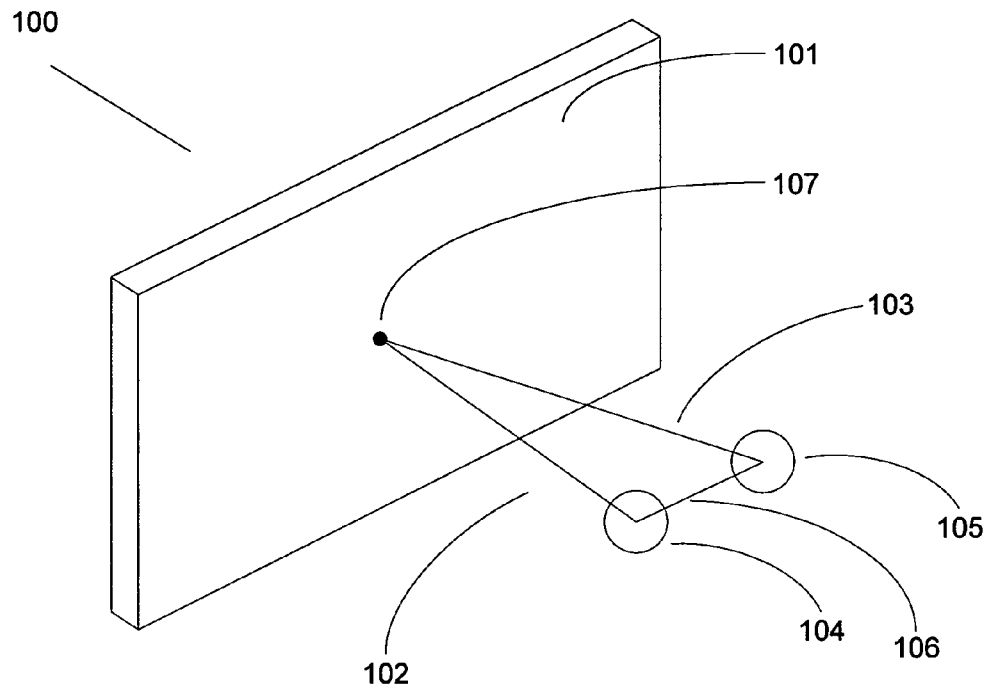
FIGS. 1A, 1B, 1C, and 1D use simple drawings to classify the types of parallax that are encountered in stereoscopic displays.

As noted, in FIG. 1A, the left and right image points on display surface 101 are given by point 107. These left and right image points correspond or overlap and this condition is known as "zero parallax." Such an image point will appear at the plane of the display surface 101, and the eyes tend to converge inwardly to fuse point 107 so that lines of sight 102 and 103 cross at point 107.

Figure 1B:
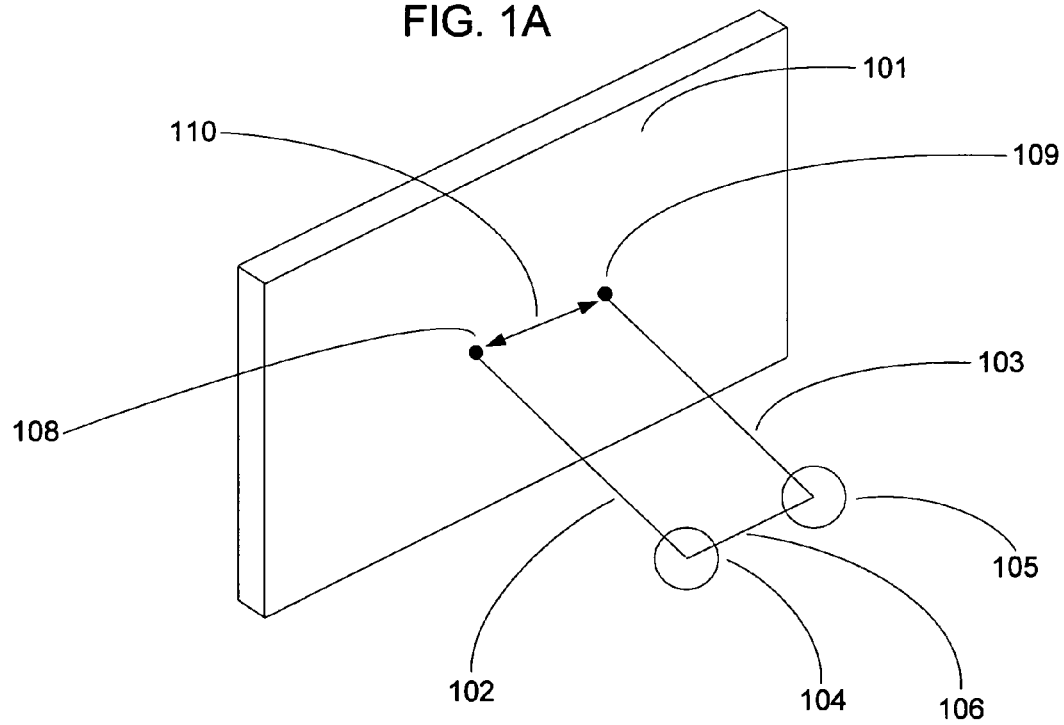

With regard to FIG. 1B, parallax points 108 and 109 are separated by distance 110, given by arrowed line 110 whose distance is the same as the interpupillary separation 106. In other words, the parallax value of points 108 and 109 is equal to the interpupillary separation of left and right eyes 104 and 105. In such a case, the lines of sight 102 and 103 of the left and right eyes are parallel. When viewing parallax points with this condition, the image will appear to be at some great distance, that is to say, stereo-optical infinity. In the real world, when looking at distant points, the lines of sight of the eyes will be parallel, just as shown in FIG. 1B.

An assumption is made that the screen parallax value 110 is the same as the observer's interpupillary distance, and in fact this phenomenon is only sometimes the case since the interpupillary distance varies with age and sex within the population and as a result of natural physiological variations.

Figure 1C:
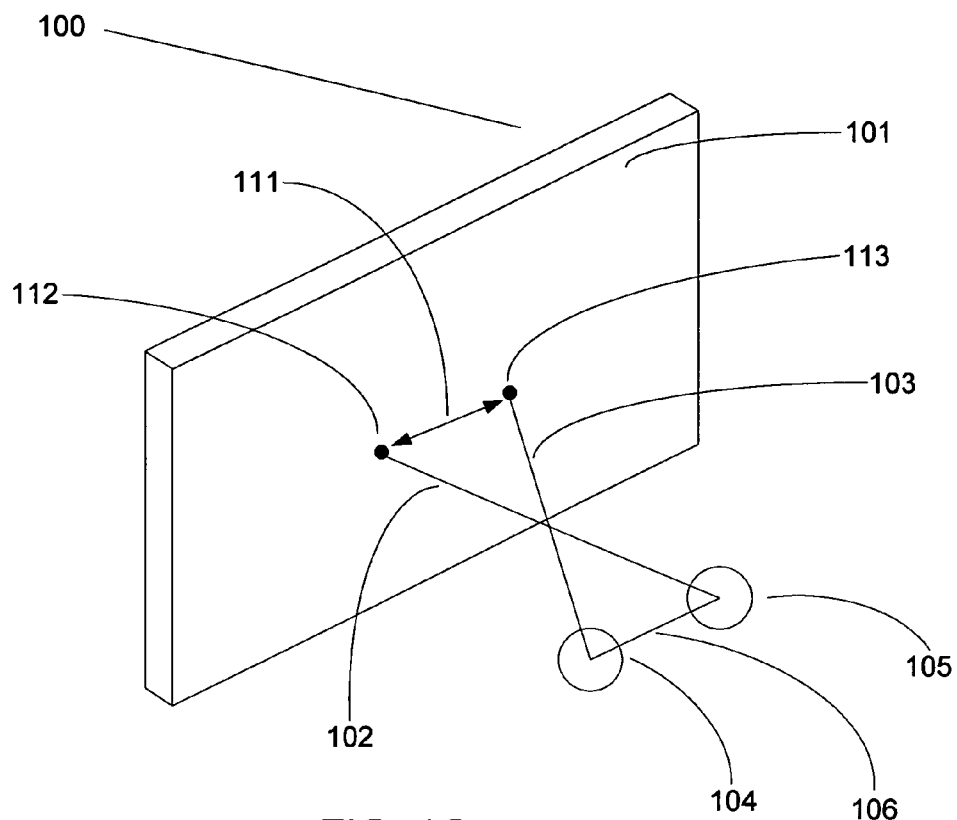
Figure 1D:
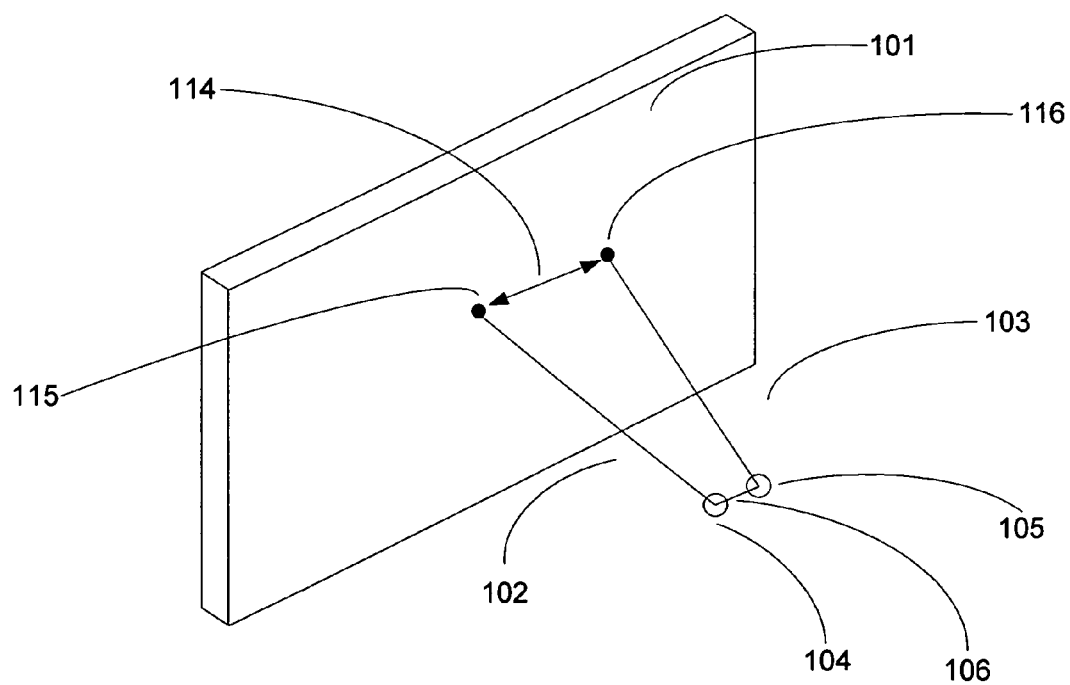

FIG. 1D is similar to 1B, except that distance 114, illustrated with arrows pointing to corresponding points 115 and 116 is greater than the interpupillary separation 106. Therefore, lines of sight 102 and 103 (and the eyes themselves) diverge, a phenomenon known as divergence, as shown in FIG. 1D. However, because divergence does not occur in the visual field, the eye muscles are required to be exercised in an unusual manner and for many people this will cause discomfort. Therefore, except for small increases beyond the interpupillary separation, divergence is to be avoided. However, as implied above, divergence, as a practical matter is likely to occur for children, who are looking at material prepared for an adult interpupillary distance. But children are more adaptable than adults to stereoscopic images so they are not likely to experience visual fatigue despite the divergence they experience.

An additional type of positive parallax scenario is similar to that drawn in FIG. 1B illustrating parallel lines of sight. The difference is that the lines of sight converge, though not enough to intersect at or in front of the display surface. If the left-eye and right-eye lines of sight converge but do not intersect each other until behind the display surface, this is still considered to be positive parallax. The viewer will perceive such a positive parallax scene element to reside farther away than the display surface, but not as far away as infinity.

By convention, the parallax values in FIGS. 1B and 1D are assigned a positive value, because the lines of sight are not crossed as is the case in FIG. 1C.

FIG. 1C illustrates the case of negative parallax (sometimes called crossed parallax) or off-screen parallax. In FIGS. 1A, 1B, and 1D, the parallax values will induce a stereoscopic depth effect which is either at or behind the plane of the screen. Conversely, in the case of FIG. 1C, parallax 111 produces an off-screen effect. The important point is that the lines of sight 102 and 103 are crossed. When viewing this image, parallax points that have crossed values appear to be off-screen.

Again, zero-parallax points appear at the plane of the screen, positive-parallax points appear behind the plane of the screen, and negative-parallax points appear in front of the screen. Beyond certain values the image becomes uncomfortable to view, or because of system constraints undesirable artifacts appear which contribute to difficulty in viewing the stereoscopic image.

FIG. 1C illustrates negative parallax that produces off-screen effects and here, as in the case of divergent parallax, there are practical limits. The eyes can be asked to fuse values of negative parallax only up to certain values before the image breaks down and a double image is seen by the viewer and/or discomfort is felt. Some flexibility exists since the creation of stereoscopic images is an artistic process and large values of parallax are tolerable, for example, for objects rapidly moving toward the audience and off the surface of the screen.

In addition, the location of object points and their relationship to the screen surround are important considerations. The screen surround is generally synonymous with the screen edges.

The concept of the breakdown of accommodation and convergence is important for stereoscopic displays and has an impact on the problem addressed here. In the real world, the eyes will both focus (or accommodate) and converge on objects in space in synchrony. Such focusing is a habitual or learned response because the neurological pathways for accommodation and for convergence are separate. When looking at stereoscopic displays, the eyes remain focused at the plane of the display, but convergence varies for various dependent upon the values of the parallax points. This lack of correspondence between convergence and accommodation is described as the breakdown of convergence and accommodation, and applies only when viewing stereoscopic displays. The lack of correspondence can produce stress or discomfort or what people sometimes call "eyestrain."

Figure 2A:
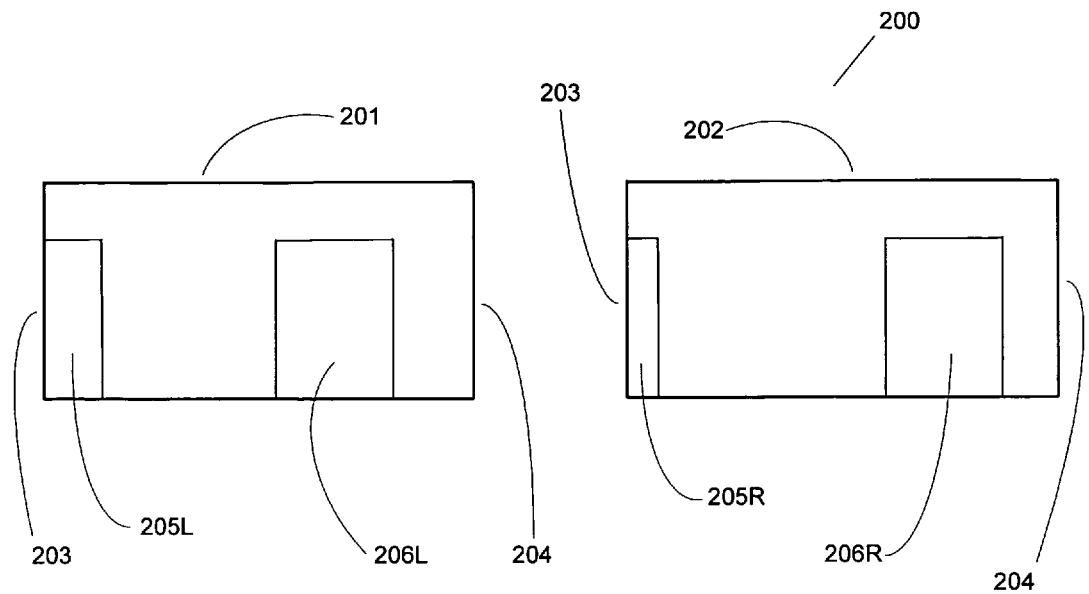
FIGS. 2A and 2B are drawings used to show prior art attempts at correcting the conflict of cues that occur at the screen surround vertical edges by means of the creation of an artificially induced screen surround.

Additional concerns exist with respect to image viewing in this context. In particular, stereoscopic image composition and the placement of objects in relationship to the screen edges or surround and in particular to the vertical edges of the screen are of concern. FIG. 2A shows a stereo pair with left image 201 and right image 202. The vertical edges of the screen surround 203 and 204 play a part in a phenomenon that has to do with a conflict of extra-stereoscopic (monocular)

and stereoscopic cues. The screen surround is sometimes referred to in the literature as the "stereo window." When viewing stereoscopic images, the analogy is frequently made between looking at the screen and looking through a window. In the case of a looking through a window, objects rarely intrude between the window and the observer.

In the case of the display shown in FIG. 2A, object 205 (represented by 205L and 205R in the left and right halves of the stereo pair respectively) has negative parallax. Object 206 (represented by 206L and 206R in the left and right halves of the stereo pair respectively), has positive parallax. Note that portions of object 205 (205 is meant to represent a complete rectangle) are cut off by the left vertical edges of the screen surround 203. In such a case the eye-brain will perceive that the image trying to come off-screen because of the stereoscopic or parallax cue. However, the eye-brain also perceives a conflict of cues because the screen surround, or that portion of the stereo window at 203, also provides an important depth clue, namely one of interposition, tells the observer that the object must be behind the plane of the screen. In other words, a near object (element 205, having negative parallax) seems to be blocked by something that is farther away (the display edge at zero parallax). This confusing condition is called a "conflict of cues," and is to be avoided. To some people the result is perceived as a blur, to others it is merely uncomfortable, and to others the image does not seem to be coming off the screen as was intended, but gets pushed back into the screen. This imaging artifact never occurs in the visual world so people have no ready way to articulate what is being seen.

The present design seeks to cure the problem of the screen surround conflict of cues and thereby increase the enjoyment of perceiving a stereoscopic image.

A person of ordinary skill in the art will understand that this disclosure covers the projection of images using both conventional mechanical motion picture or digital projection technology and what is disclosed here also applies to electronic displays such as desktop display signage, scientific visualization or home television applications. It should also be apparent to a person of reasonable skill in the art that the discussion here with regard to projection on large screens also apply, with minor modifications, to the smaller television screens used in people's homes. In addition, although the discussion here is in the context of stereo pairs, a worker with reasonable skill in the art will likewise recognize that simple and obvious modifications of the techniques described in this disclosure can be applied to the multiple perspective views required by many kinds of autostereoscopic displays.

The present designs for adjusting parallax values at the vertical edges of the screen surround may be used for projection or hardcopy, and for electronic display devices using cathode ray tube or similar technology or for flat panels such as plasma, light emitting diodes, or liquid crystal display screens.

As noted above, a negative parallax scene element appearing at the screen edge presents a conflict of cues because the stereoscopic cue, with reference to FIG. 2A, indicates to the eye-brain that the image is in front of the stereo window. However, the depth cue of interposition provided by the surround tells the eye-brain that the object 205 is behind the plane of the screen. If the image creator desires an off-screen effect, such an implementation does not work for most observers and for many observers the result is one of confusion or a disturbing visual experience.

For the relatively few large theaters with very big screens, this may not be a problem, because the vertical edges 203 and 204 of the screen surround may be so far into the peripheral vision area of the observer that there is no conflict of cues.

However, for most motion picture theaters that are common in the United States and in other parts of the world, the conflict of cues that can arise at the vertical edges of the screen surround is potentially disturbing and addressing these cue conflicts can provide beneficial viewing results.

For a typical moving picture composition, an over-the-shoulder shot, object 205 represents the back of a person (who is talking to another) and object 206 represents a second person. A conflict of cues arises because the image of the person 205 has negative parallax. The problem is as important to solve for the smaller home TV screen as it is for the large theater screen. For the home TV set the vertical surround of the screen is more noticeable and therefore the conflict of cues of interposition and stereopsis for objects occluded by the edges of the screen may be even more noticeable.

Note that sometimes objects with negative parallax do not have to be occluded, or blocked, but simply need to be near the vertical edges of the screen to produce a seeming conflict of cues. On a television screen the related phenomenon of the breakdown of convergence and accommodation can be more of a problem than for the large screen because of the closer viewing distances. A large viewing distance, such as is the case in the theater, can subdue the breakdown of convergence and accommodation. Due to the close viewing distances, viewing stereo images on small screens is more difficult than viewing on large screens. This is despite the fact that the parallax values, which are proportional to image magnification, may be less for a small than a large screen, assuming that the image was originally prepared for the large screen. Accordingly, correction of the edge conflict of cues is important for TV screens as well as theater screens, and the present design addresses both problems.

Figure 2B:
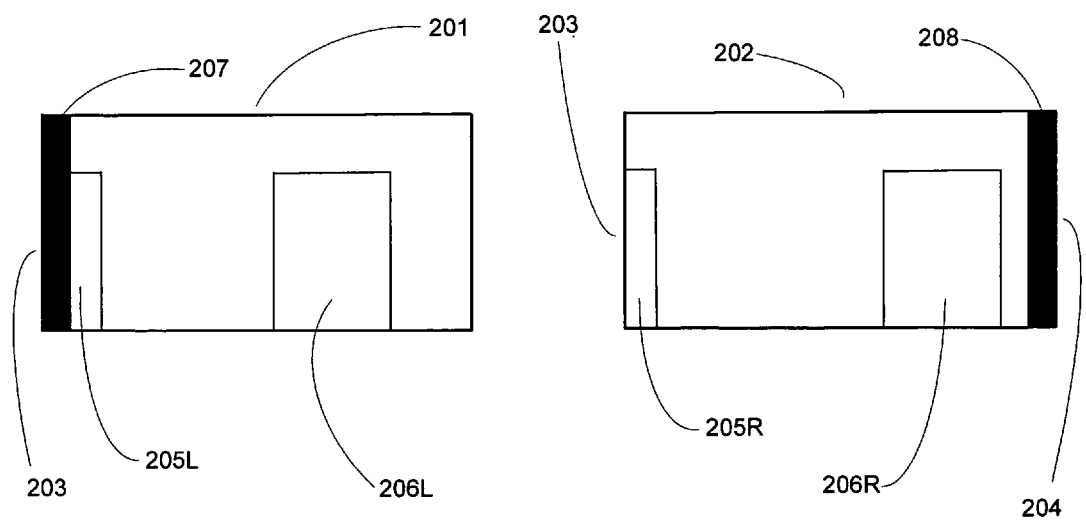

If the depth range (near to far distances producing corresponding parallax) in photography is great, one solution is to increase the effective parallax budget in projection space as shown in FIG. 2B. Such a solution was employed by Raymond and Nigel Spottiswoode in their 1952 film *The Black Swan*. In this example the surround has black vertical bands added to the edges of the frame such that a new closer stereo window is created. The system adds a black vertical bar 207 to left screen edge 203 of the left-eye view 201, and a similar vertical bar 208 to the right screen edge 204 of right-eye view 202. The edges of the motion picture frame are cropped in such a way to generate a negative parallax value for the vertical edges of the surround itself. The generation of these "parallax bars" places a new stereo window out into the audience space, beyond the screen surround, and thus avoids the conflict of cues. The off-screen parallax range or parallax budget is extended by reducing or eliminating the conflict of the stereoscopic and interposition cues at the vertical edges of the surround.

The horizontal edges of the surround do not exhibit the same kind of conflict of cues found at the vertical edges. The horizontal edges tend to be relatively benign in this respect. For one thing, no image points create parallax values in the stereo window, so objects such as hanging chandeliers and the like intruding into the horizontal edges of the surround tend to appear acceptable. Moreover, no direct means exist to address any cue conflicts at the horizontal edges of the surround, since there are no parallax points to reference. However, by generating the new stereo window with 207 and 208 vertical occlusion elements, in effect the entire stereo window is brought closer to the audience, thereby increasing the parallax budget.

The problem with the Spottswoodes' approach is that this technique destroys the appearance of off-screen effects, which for many people is the raison d'etre for three-dimensional movies. In other words, objects with negative parallax—for example, in the center of the image field—will not appear to be coming off the screen because the stereo window reference has now been moved forward. Thus an off-screen object (as far as parallax is concerned before the addition of the Spottiswoode surround) will not appear to be coming off-screen, destroying this much sought after effect. The disturbing conflict of cues for the vertical edge surround is cured, but at a heavy price since so much of that which is valued in the stereoscopic motion picture experience is consequently eliminated.

Three major embodiments for addressing the screen surround conflict of cues are provided. The three approaches reduce the parallax unobtrusively so that the resultant image or images appear at or near zero parallax, at the vertical screen surround, an especially important correction for negative parallax values. Digital image processing and computer manipulation are employed to achieve this end. The three embodiments include an approach for parallax manipulation that, in effect, applies variable convergence as a function of location across the screen surface or width, and two other approaches that reduce screen parallax to planar values as a function of location across the screen surface or width.

The first embodiment, illustrated using FIGS. 3A, 3B, 4A, 4B, and 4C, stretches either or both of the left and right edges of either or both of the images of the stereo pair (for example, stretching one edge of one stereo pair element, and stretching the opposite edge of the other stereo pair element), causing the parallax values to gradually decrease over the screen area adjacent to the surrounds' vertical edges at a measured rate so as to be unobtrusive. This edge stretching tends to reduce the troublesome negative parallax values to at or near a zero value. In other words, the system can adjust or stretch one of the images of the stereo pair so that its image points are more in correspondence with the other perspective view's image points. The result is that negative parallax is reduced to zero or near zero by setting the convergence of the image in such a way that the zero parallax location departs from a plane in camera space and is made to vary as a function of screen location. This, in effect, is isomorphic with having a curved surface replace the plane of convergence in camera space to move off-the-screen objects to the plane of the screen while moving background parallax points even further from the plane of the screen into positive parallax space but only at the vertical edges of the screen surround. The process is controlled and gradual for only a small percentage of the image width, adjacent to the left and right vertical edges of the screen so that the resultant gradual non-linear re-convergence is unobtrusive at the edges even when compared with the image at the center of the frame.

Figure 3A:
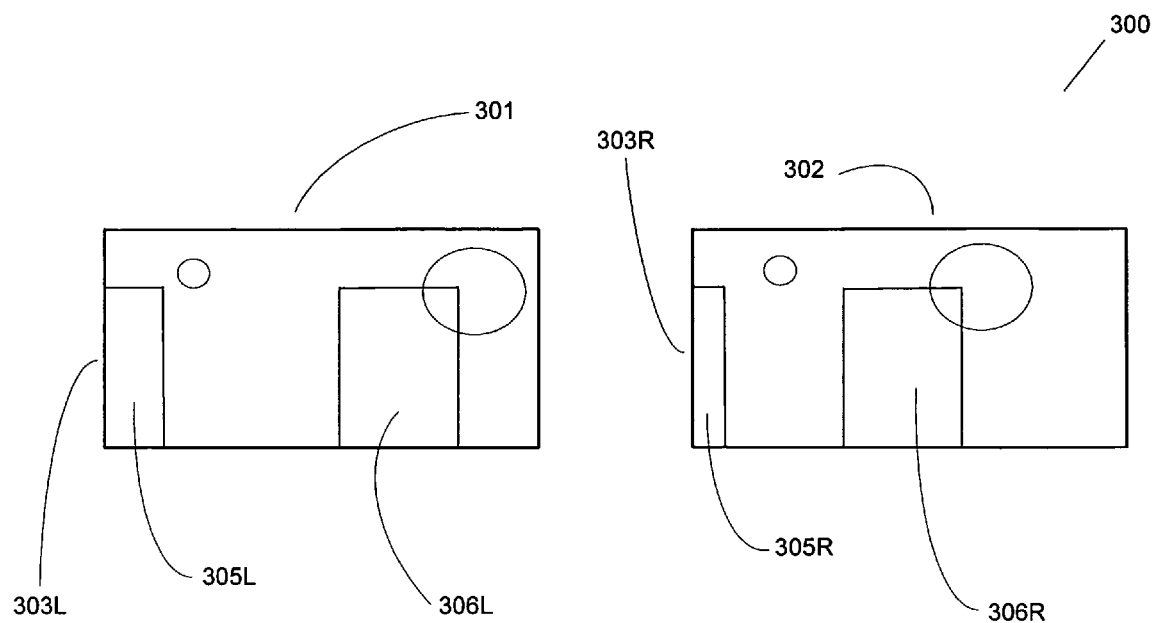
FIGS. 3A and 3B are drawings used to explain the principle of the disclosure wherein parallax values at the edges of the screen can be adjusted.
Figure 3B:
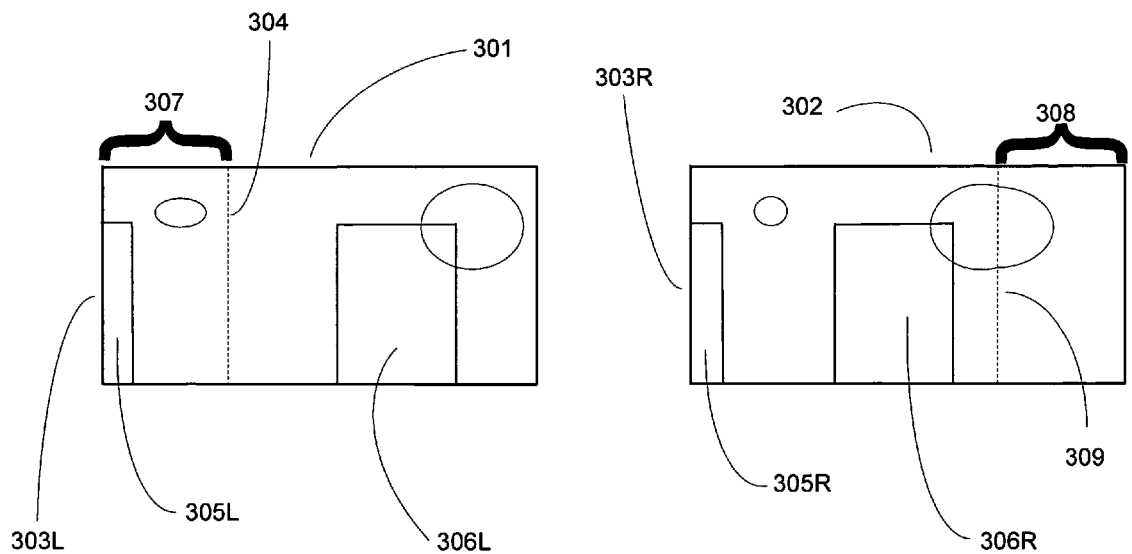

FIGS. 3A and 3B are used to illustrate the embodiment described in general terms above. These drawings may be free-viewed using the divergence (side-by-side with left image on the left and right image on the right) method or viewed in a stereoscope for illustrative purposes. In addition, a person of ordinary skill in the art will understand that the examples, as given below, can be generalized to include multi-view autostereoscopic imaging systems that use more than two perspective views. This can be accomplished by proportionally managing the desired topological transformation, as outlined for the three given embodiments, to a multiplicity of perspective views rather than to the two that are inherent in a stereo pair.

In this instance the concern is with regard to the first of the three embodiments in which the edge parallax values are controlled by what will be described forthwith. In FIG. 3A, left frame 301 is shown, as is right frame 302, together representing images of objects 305 and 306. Of particular interest is object 305, which is partly occluded by frame edges 303L and 303R. The left eye view instance of object 305 is 305L, and the right eye view instance of object 305 is 305R. As 305R appears shifted leftward relative to 305L, object 305 resides in negative parallax space.

Thus, the image of object 305, when projected on a screen or other display, has the conflicting set of stereoscopic and monocular depth cues as described above, as it is a negative parallax object that is in front of, but occluded by, a zero parallax image edge. In other words, the cue of interposition provided by the vertical screen surround elements 303L and 303R indicate to the observer's eye-brain that object 305 (made up of elements 305L and 305R) is behind the plane of the screen, whereas the negative or crossed parallax values of the object's image will indicate to the observer that the object is in fact in front of the screen. No such conflicting set of depth cues exists for the object 306, which comprises left and right views 306L and 306R. The present design seeks to preserve the full parallax range for objects such as 306 that are not near the left and right screen edges, and hence not subject to the conflict of cues, while eliminating (or greatly reducing) negative parallax for objects such as 305 that are intersected by a vertical screen edge.

In this first embodiment, the system selectively applies an increasing amount of horizontal shift as the screen edge is approached in order to shift all parallax values near the left and right screen edges more towards positive parallax. The result is that negative parallax shifts to zero parallax while what was originally at zero parallax or positive parallax shifts even more into positive parallax.

Shifting the entire left-eye view leftward, relative to the right-eye view, results in all parallax values in the scene shifting toward positive parallax. However, such shifting is not desired here, as the intent is to keep parallax values through most of the image unchanged. Image data in the left-eye view is shifted leftward relative to right-eye view image data, only near the screen edges. The challenge is to do this gradually and unobtrusively. That challenge is answered by applying a horizontal image stretch whose stretch is variable relative to the distance from the screen surround. The amount of stretching is greater at the very edge of the surround and is lessened toward the middle of the image field.

To understand the operation of the present design, small region 307, along the left side of the left-eye view, is taken and stretched, anchoring the stretch effect along the right edge 304 of that region. The portion of the stretched image field falling off the left edge of the screen is clipped off. The result is that image elements within the region 307 are shifted leftward, and shifted leftward by greater amounts the closer they originally were to the screen edge. Image elements residing right at the boundary line 304 of the stretch region 307 remain in place, and image elements close to the left of that boundary line 304 are not shifted leftward significantly. Thus the transition between unshifted and shifted regions is relatively smooth. Meanwhile, image elements originally very close to the left edge are stretched by a greater amount, possibly taking them entirely off of the image edge. The end result of this leftward image stretch is that negative parallax shifts towards positive parallax, for scene elements close to the left edge of the screen.

The same approach may be used for the right screen edge. A similar region 308 (brackets), near the right edge of the right-eye view, can be stretched rightward, anchored along the left edge 309 of that region, and the right edge of the screen clips off some of the stretched image content. The result is that, near the right edge of the screen, right-eye content is shifted rightward relative to left-eye image content, resulting once again in the desired shift towards positive parallax.

Note that stretching may be a linear horizontal stretch, but need not be linearly variable. In fact, a variable stretch effect increasing in magnitude as it approaches the screen edge may yield the best results for all or at least many subjects. Horizontal image compression, squashing, or inverse stretching can be applied here, in addition to stretching or instead of stretching. Any kind of horizontal image deformity that shifts image elements in portions of the left-eye view leftward relative to portions of the right-eye view (or shifts right-eye view elements rightward relative to left-eye view elements), and which does this selectively and relatively unobtrusively near the left and right vertical edges of the screen, constitutes an application of the general technique described herein.

This stretching may be accomplished in terms of digital image manipulation using off-the-shelf tools commonly employed in motion picture post-production houses that are well known and specific to the editing product employed. Such topological manipulations are generally well known and in wide use and no limitation with regard to the algorithm described here is intended or given. This description has been made with regard to the left and right image frames themselves in FIGS. 3A and 3B and not with regard to the viewing experience in the theater or that which occurs in camera space at the time of image capture.

Figure 4A:
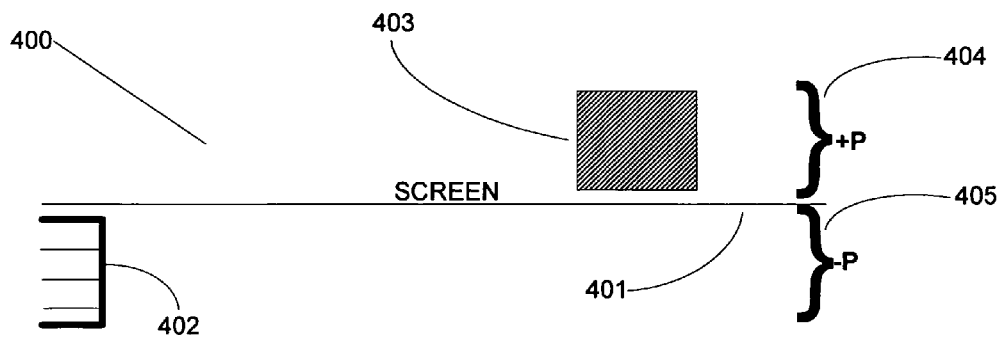
FIGS. 4A, 4B and 4C illustrate matching corresponding points for objects with negative parallax occluded by the screen surround and gradually reducing their parallax values to zero at the screen surround.
Figure 4B:
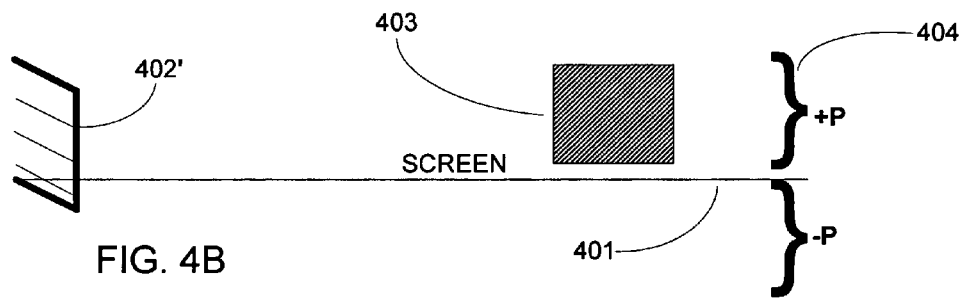

FIGS. 4A and 4B are views from the top of the theater looking down on a cross-section of the theater screen. Top view FIG. 4A illustrates the conflict of cues at the left edge of the screen surround and shows projection screen 401 and in-screen or positive parallax space 404 marked +P and off-screen or negative parallax space 405 marked –P. Objects 402 and 403 correspond, respectively, to 305 and 306 of FIGS. 3A and 3B. The hatching is used to convey that these are solid objects, though mostly only the front surfaces of the objects can be seen by audience members as shown in FIGS. 3A and 3B.

Figure 4C:
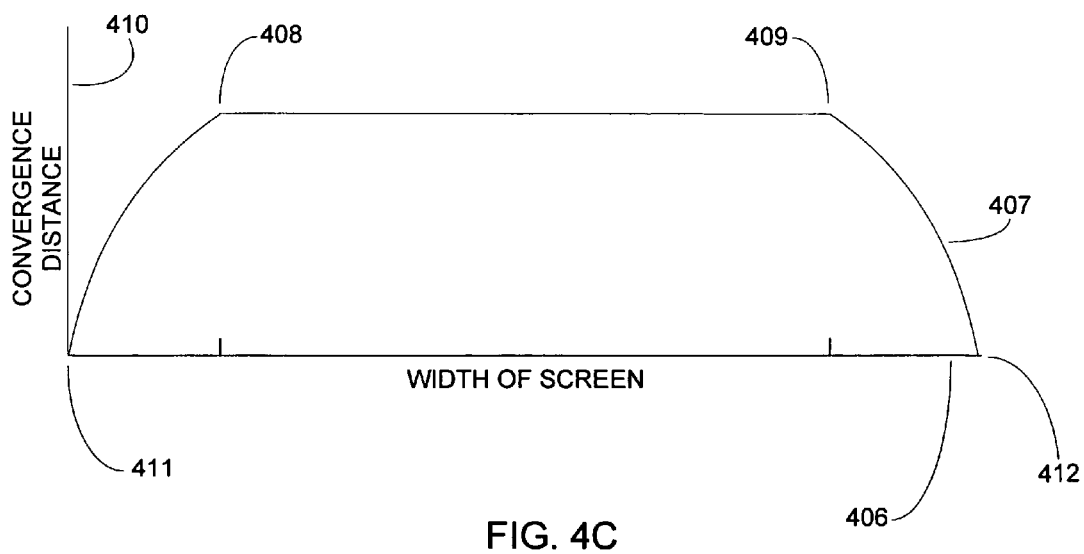

The elimination in the conflict of cues is illustrated in FIG. 4B using the same image elements as FIG. 4A. However, object 402, or the portion of object 402 still visible, is now labeled 402' to signify this change, and appears to have been pulled back towards and partly behind the plane of the screen. The front surface of object 402, where closest to the left screen edge, now resides at or near zero parallax, and other portions of 402' are also closer to zero parallax than they had been. This parallax shift has been achieved by causing the image points (essentially representing the front surface of the object) that make up 402 to shift horizontally as a result of the stretch function that was applied to part of one of the stereo pair images. This manipulation is isomorphic with the following construct: The plane of convergence has had its shape altered as illustrated in FIG. 4C, showing the width of the screen at abscissa 406, and the convergence distance at ordinate 410. Herein the shape of the convergence surface is graphed in camera space as a function of distance, in this case a referral having been made to the extent or width of the theater screen. Point 411 represents the origin of the graph, and point 412 the end of the screen, the origin representing the left edge of the surround and the end of the screen the right edge of the surround. Curve 407 is the curve or graph in question, which would be a straight line in ordinary circumstances, described below, but which, because of the stretching algorithm employed at the screen edges (assumed employed at both left and right surround edges) now curves from the edge of the surround to points 408 and 409 corresponding to 304 and 309 of FIG. 3B. The arcs shown are descriptive and not necessarily representative of any specific stretching algorithm.

"Ordinary circumstances" refer to the shape of the plane of convergence, which on the graph FIG. 4C is a horizontal line. This assumes that the left and right camera lens axes are parallel and that so-called convergence is achieved by horizontally shifting the image to achieve correspondence of zero parallax points rather than by toe-in or inward rotation of the camera lenses. Inward rotation of the camera lenses produces a saddle-shaped curve. Photography employing either horizontal shifting or toe-in can be corrected to eliminate the edge surround conflict of cues using these teachings, but horizontal shifting may yield better results.

This, the second embodiment, has a goal similar to that of the first embodiment, namely to selectively reduce negative parallax values approaching the screen edges by applying horizontal manipulation of image points. However, this embodiment does not aim to simply shift the negative parallax to zero parallax values, but rather to reduce all parallax to zero parallax. That is to say, the edges of the image, adjacent to the screen surround, become transformed to planar following a planned and gradual function. This embodiment is described in detail with the help of FIGS. 5A, 5B, and 5C.

The second embodiment uses image morphing of one or both of the images of the stereo pair to cause the parallax values to gradually decrease over distance at a measured rate to be both unobtrusive and reduce the troublesome negative parallax values to zero or nearly zero adjacent to the screen surround. This embodiment in effect reduces the entire parallax extent of the region adjacent to the surround to zero since the morphing approach causes all image points to correspond thereby flattening the image. This flattening of the image, or controlled reduction to planar, at the vertical surround region, serves to eliminate the conflict of cues.

In order to reduce overall parallax, specific scene elements are represented in both the left-eye and right-eye views with corresponding left and right points brought into correspondence by means of an image morphing process. All such homologous points are made to correspond by mapping and matching respective horizontal positions. As corresponding image elements in left-eye and right-eye views move closer together horizontally, respective parallax effects are reduced towards zero parallax. If the left-eye and/or right-eye views are morphed in such a way that all corresponding image elements overlap each other perfectly, all parallax effect will have been eliminated, and that scene portion will reside at zero parallax.

Various published algorithms identify corresponding points in a stereo pair through an automatic process. Point matching is one example of a generally available algorithm for identifying corresponding points in a stereo pair. A list of algorithms that may be employed in this regard is given at:

http://bj.middlebury.edu/~schar/stereo/web/results.php

Alternatively the user can manually specify corresponding points, or utilize a combination of automation and user input. 3-D scene data may exist that can be used to derive the desired correspondence information, especially if the image is a computer generated image. Various image morphing algorithms are available that are designed to move image points by set amounts while smoothly distorting image sections in the vicinity of those image points, resulting in a pleasing image that also applies the desired image offsets. Any off the shelf morphing program may be used but in such a case the points are generally selected manually. An example of one such program is Morpheus Photo Morpher. These morphing algorithms generally consist of smoothly applied image deformations applied to image sub-regions, anchored by points that may be moved from their original locations.

As with the first embodiment, this morph effect may be applied only in regions near the left and right vertical screen edges, and applied by an increasing amount as one approaches either of the screen edges. The minimum morph, applied farther from the screen edges, alters the image very little. The maximum morph, applied right near the screen edges, would morph by a sufficient amount that corresponding points in the image pair would nearly or completely match. While a simple implementation might apply a variable morph effect whose magnitude increases linearly approaching each screen edge, it can be more effective to have a morph effect that is not linearly variable, whose magnitude increases more sharply as each screen edge is approached.

Morph effects may be applied to desired regions of the left-eye view, desired regions of the right-eye view, or to both. Corresponding points in the two image views are moved relative to each other such that parallax effects are reduced by the desired amount as appropriate based on the closeness to the left or right screen edge.

By selecting corresponding points in the left and right image immediately adjacent to the vertical screen surround, the points in one perspective view are brought into correspondence with the other view, thereby reducing the difference between the points and parallax to zero or near zero.

To use an example, assume one particular image point, such as the representation of the tip of a person's tooth, appears near the image edge. The image point has some positive or negative parallax offset between the two stereo pair elements representing that tooth. A point-matching algorithm identifies the respective points on each stereo pair corresponding to that tooth point in the scene. Then, a morphing process would shift one eye view's representation of that tooth much closer towards the other eye view's representation of the tooth, thus reducing or eliminating the parallax effect of the tooth. The morph process insures that image areas near the tooth are deformed in such a way as to appear smooth, while also respecting any point shifts relating to other image elements, such as other teeth and the rest of the face.

Figure 5A:
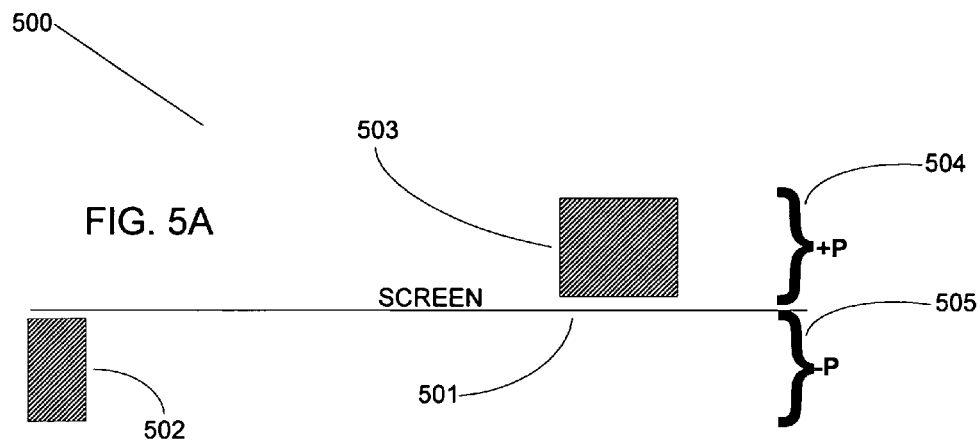
FIGS. 5A, 5B, and 5C illustrate the principle of compression of parallax values by matching of corresponding points through morphing.
Figure 5B:
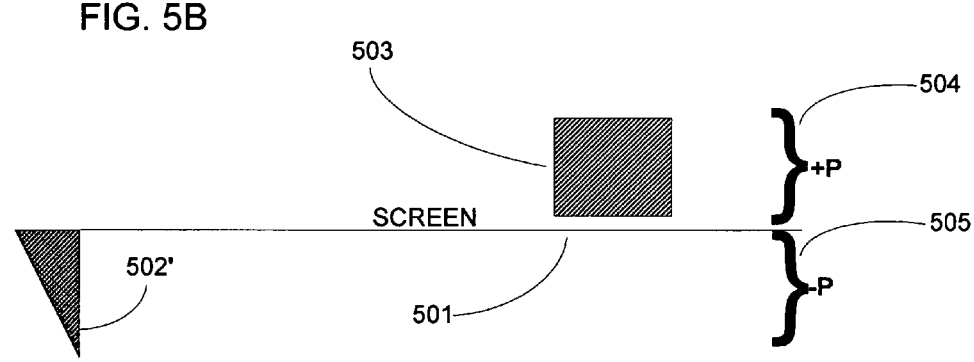

Top view FIG. 5A shows projection screen 501 and in-screen or positive parallax space 504 marked +P and off-screen or negative parallax space 505 marked –P. Images 502 and 503 correspond, respectively, to images 305 and 306. Hatching in these views conveys that these are solid objects but essentially only the front edges of the objects can be seen by audience members as shown in FIGS. 3A and 3B. FIG. 5B, which depicts the scene after morphing has been applied, has the same image elements as FIG. 5A but with this exception: Object 502 has seen its parallax effect reduced towards zero parallax, and is now labeled object 502' to signify this change. Note that object 502' is represented as having been flattened progressively towards the edge of the screen and is thus represented as a triangle or wedge shape. Due to the morph effect of reducing the parallax magnitude, object 502' has considerably less depth than the original 502, particularly approaching the left edge of the scene. This parallax shift has been achieved by causing the image points that make up object 502 to correspond through a process of morphing. Image point correspondence has been employed to flatten object 502 into object 502', approaching zero parallax at the edge of the screen. In the prior embodiment, all parallax values were shifted towards positive parallax regardless of correspondence to any object whatsoever.

Figure 5C:
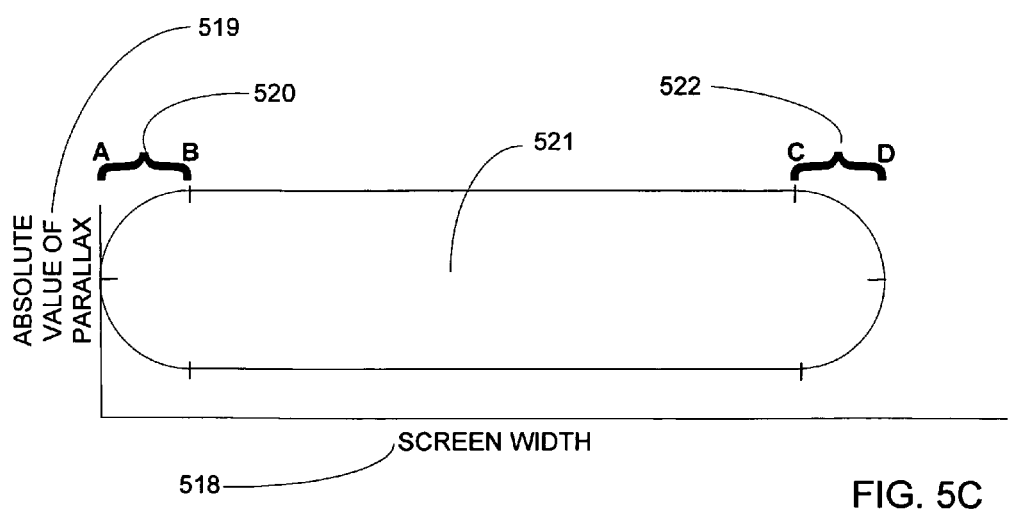

This change is graphically depicted by reference with FIG. 5C in which the parallax range is shown to have been compacted gradually towards the edges of the screen. The ordinate 519 gives the absolute value of parallax in the stereo pair and abscissa 518 is the screen width, with the six-sided figure 521 a plot of the absolute value of parallax a function of distance. In this case a referral has been made to the extent of the theater screen. Normally the parallax extent would be a rectangle but the curve 521 is produced by the morphing algorithm employed at the screen edges. Here it is assumed the morphing algorithm is employed at both left and right surround edges, as it normally would be. Region 520 is shown with the brackets delimited by A and B, which correspond to region 307 bracketed of FIG. 3B. Region 520 is the left-handed edge region immediately adjacent to the left handed side of the screen. The right handed region is called out between brackets delimited by C and D. Although the curves between A and B and C and D are shown to be straight lines they are provided in this orientation for didactic purposes and other shaped curves can apply to the process. A similar explanation covers region 522 covering bracketed area C to D for the right edge of the screen surround.

The morphing algorithm is executed by selecting corresponding points and producing a gradual morph over the extent of the region 520 so as to increase the extent of image point correspondence with increased correspondence as the edge of the screen is approached. Morphing is a generally understood concept and algorithms for morphing are commonly available. In general, morphing transforms an image or object smoothly from an initial state to a different final state. Morphing may be readily accomplished in terms of digital image manipulation that uses off-the-shelf tools by motion picture post-production houses. Such morphing is well known and in general morphing is specific to the editing product employed. Such topological manipulations are well known and in wide use, and are included in such programs as Fanta Morph, Gryphon Software's Morph and in proprietary software used in motion picture post production. No limitation with regard to the algorithm described here is intended or given.

A possible variation of this embodiment selectively identifies and morphs only negative parallax scene elements, leaving positive parallax magnitude intact, or mostly intact, rather than reducing all parallax effects approaching the screen edges.

This general approach can be applied without a morphing process, if using 3-D computer graphics that has not yet been rendered to a stereo pair. The two perspective projections, left-eye and right-eye, normally computed based on a horizontal stereoscopic separation of two virtual cameras, can be manipulated such that the stereoscopic separation is progressively reduced, approaching zero, when nearing either of the screen edges of the two perspective projections.

The third embodiment uses a spatial cross-fade, dissolving edge portions of one of the images of the stereo pair into the other to cause the parallax values to gradually diminish at a measured rate to be both unobtrusive and reduce the troublesome negative parallax values to zero or near zero adjacent to the screen surround. This third embodiment is described with the help of FIGS. 6A and 6B.

As with previous embodiments, there is no desire to disturb the central portion of the left and right image fields that are not near the left or right screen edges, so as with the other approaches, most implementations of this approach affect only the regions near the screen edges, while leaving the mid-section of the image fields unchanged.

With regard to cross-fading, the present embodiment comprises applying an image blend using weighted averages of corresponding pixel values, of the left eye view and the right eye view, to portions of the image relatively close to left and right image edges, such that parallax effects are reduced or eliminated near image edges.

The spatial cross-fade of this embodiment applies a variable image blend or a change in density from light to dark or dark to light across a region, varying horizontally, immediately adjacent to the vertical edges of the surround, of one stereo pair component into the other, this variable image blend being applied across the width of a relatively small sub-region of the scene close to the left or right screen edge. This cross-fade or image blending could be specifically accomplished by applying a weighted average of corresponding pixel values. For example, if a particular pixel in the left eye view is colored green, the corresponding pixel in the right eye view is colored black, and the implementation calls for that particular pixel in the left eye view to be replaced by a 75%-25% mix of the left and right eye views, a weighted image blend would yield a somewhat darker green.

As with the other approaches discussed, the effect is minimized farther away from the screen edge, and maximized right at the screen edge. Thus, at the boundary of the cross-fade region farthest from an image edge, one expects this approach to have minimal effect on the image fields. Conversely, very close to the screen edge, the cross-fade should be so close to complete that the image content in the two stereo pair elements should very nearly match. In between those two extremes, the cross-fade is partial, resulting in some minor stereoscopic ghosting, but providing a smooth transition between the rich range of stereoscopic parallax in the main scene, and a flat zero-parallax effect alongside the left and right screen edges.

Across the width of the cross-fade regions where this approach is applied, such an effect gradually replaces one of the images, at the surround edge, with the other so that as progress is made across that region, one of the images is entirely replaced with the other. This embodiment will, in effect, reduce the entire parallax of the region adjacent to the surround to zero since it gradually replaces the one eye-view's content with the opposite eye-view's content, causing all image points to correspond thereby flattening the images at the screen surround region. In other words, at the vertical surround, the image becomes planar. The image does so in a controlled and gradual fashion for only a small percentage of the image width so that the resultant diminution of stereopsis is unobtrusive at the edges compared with the center of the frame. Cross fading may be accomplished in various ways, such as in terms of digital image manipulation, and these again may use off-the-shelf tools in motion picture post-production houses, typically well known and specific to the editing product employed. Such image processing techniques are well known and in wide use, such as those available in Adobe's Photoshop, for example, or Adobe After Effects, and no limitation with regard to the algorithm described here is intended or given.

Note that the variable cross-fade effect need not be linear, and in fact may work most effectively if its application is not linearly variable. For example, one application of this embodiment might apply the cross-fade only gradually, increasing the effect of the cross-fade more drastically as the screen edge is approached.

For any given cross-fade region of the scene, the cross-fade is most reasonably applied only to one of the two stereo pair image-views, though a less simple implementation might involve changes to both stereo fields. As the magnitude of the cross-fade increases approaching each screen edge, the two stereo pair elements should approach the point where they have identical image content, thus resulting in a zero parallax effect at the screen edge. Because this embodiment applies cross-fades to two different regions of the scene, one along the left screen edge and the other along the right screen edge, both of these two cross-fades may be applied to just one of the stereo image-views. Alternately, the left-edge cross-fade may be applied to one image-view, and the right-edge cross-fade to the other image-view.

Figure 6A:
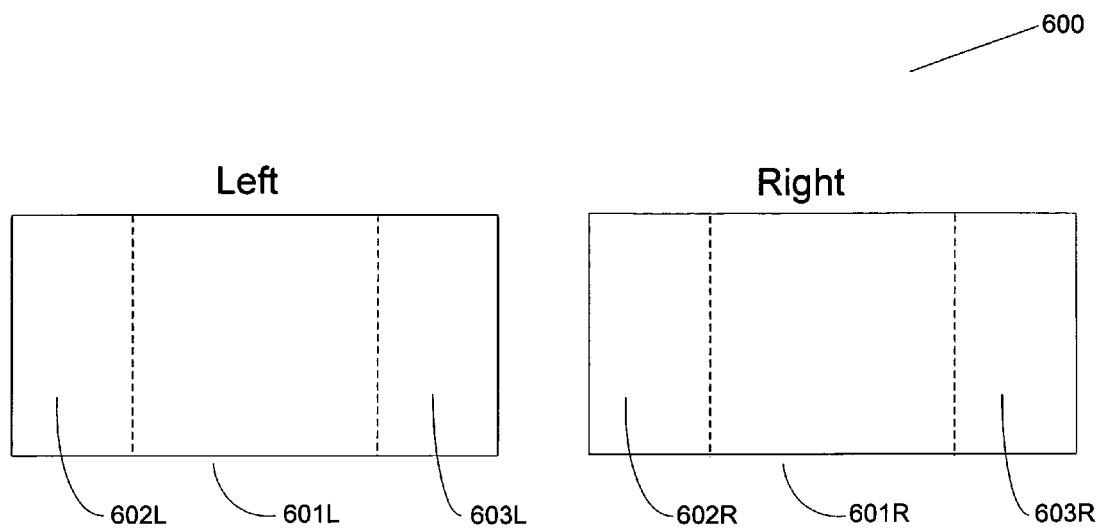
FIGS. 6A and 6B illustrate the principle of compression of parallax values by matching corresponding points through a spatial cross-fade.

FIG. 6A shows the two image-views, 601L and 601R, of a single stereo image. The interest is in applying the variable cross-fade technique only in regions (602 and 603) near the left and right screen edges. In one possible implementation, one would make no changes at all to the right image-field 601R, but within the left image-field 601L, would do a variable cross-fade of region 602R's image content into the region of 602L, and a variable cross-fade of region 603R's image content into the region of 603L.

Figure 6B:
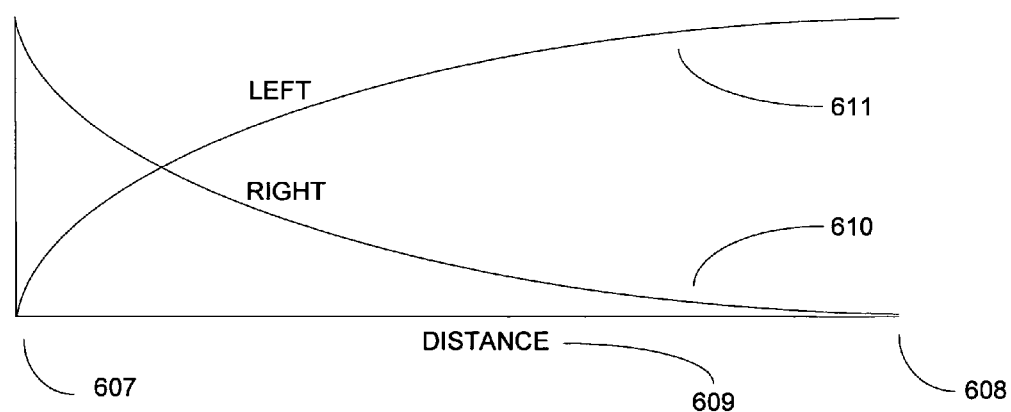

FIG. 6B shows how the spatial cross-fade can be plotted in terms of a density diagram over either of the regions (602 or 603) of the image-view 601. In this example, the cross-fade is implemented such that the right image-view remains unchanged, and all changes are made to the applicable region of the left image-view. Within the applicable region of the left image-view, corresponding image content from the right image-view will be cross-faded in along with the original left image-view content. The horizontal axis 609 corresponds to the horizontal position within the image region where cross fading is applied. The left edge 607 of this horizontal scale refers to the screen-edge side of the region, and the right edge 608 of the scale refers to the other side of the region (toward the image-view's interior). The vertical axis of the graph refers to the relative density of each image source that goes into the cross-fade, the results of which fill the applicable region of the left image-view. The relative density obtained for the cross-fade from the right image-view is represented by 610, and the relative density obtained from the left image-view is represented by 611. On the right side of the graph, representing the side of the cross-fade region toward the interior of the overall image field, all of the source content being drawn to the left image-view region comes from the left image-view, meaning that the image content remains unchanged. Meanwhile, on the left side of the graph, representing the side of the cross-fade region that is directly at the screen edge, all of the source content being drawn to the left image-view comes from the right (the other) image-view, meaning that the image content has been changed here such that it will be identical in both image views, resulting in zero parallax at the edge of the screen. In between these two extremes, some type of blend of left image-view and right-image view content occurs, the results of which will be drawn to the applicable locations in the left image-view.

Any or all of the three embodiments described above may be applied alone, or in partial combination with other approaches, or in combination with other effects such as the "black vertical band" technique as used by Spottiswoode and described above.

The three algorithms described here may be applied during post-production, in a computer generated film at the time of content creation, or may be applied by a projector or a monitor or television set at the moment of projection or display. They may be applied to one or both edges of the stereoscopic image or stereo pair. Automatic sensing of the corresponding image points have been described in the literature and are not the subject of this disclosure. The present design enables correcting for the obtrusive and distracting effect that occurs given that the composition incorporates a conflict of cues at the vertical edges of the screen surround.

The design presented herein and the specific aspects illustrated are meant not to be limiting, but may include alternate components while still incorporating the teachings and benefits of the invention, namely the improved system and method of parallax correction. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for providing stereoscopic enhanced image viewing, comprising:
    providing a stereo pair comprising a left frame and a right frame, the stereo pair being operable to be viewed on a display, wherein the left frame comprises left frame main portion content and left frame edge content, the left frame edge content being proximate to an edge of the left frame, and further wherein the right frame comprises right frame main portion content and right frame edge content, the right frame edge content being proximate to an edge of the right frame; and
    shifting said left frame edge content laterally relative to said right frame edge content while simultaneously refraining from substantially shifting said left frame main portion content laterally relative to said right frame main portion content;
    wherein said lateral shifting tends to shift negative parallax elements toward positive parallax; and
    wherein said refraining from shifting leaves the parallax values of said left frame main portion content and right frame main portion content substantially unchanged.

2. The method of claim 1, wherein the shifting comprises:
    selecting a leftmost region of the left frame of the stereo pair and horizontally stretching the leftmost region horizontally leftward; and
    selecting a rightmost region of the right frame of the stereo pair and horizontally stretching the rightmost region horizontally rightward.

3. The method of claim 1, further comprising:
    clipping that portion of the horizontally stretched leftmost region that is stretched beyond an edge of the left frame after stretching the leftmost region; and
    clipping that portion of the horizontally stretched rightmost region that is stretched beyond an edge of the right frame after stretching the rightmost region.

4. The method of claim 1, wherein horizontally stretching the leftmost region and horizontally stretching the rightmost region comprises linearly varying the leftmost and rightmost region from an inner edge of each region.

5. The method of claim 1, wherein horizontally stretching the leftmost region and horizontally stretching the rightmost region comprises one from a group comprising:
    horizontal image compression;
    squashing; and
    inverse stretching.

6. The method of claim 1, wherein horizontally stretching the leftmost region and horizontally stretching the rightmost region comprises linearly varying the leftmost and rightmost region from an inner edge of each region in combination with at least one from a group comprising:
    horizontal image compression;
    squashing; and
    inverse stretching.

7. A method of providing enhanced stereoscopic image viewing, comprising:
    providing a stereo pair comprising a right eye view and a left eye view, the stereo pair being operable to be viewed on a display;
    identifying a plurality of substantially corresponding points in the left eye view and the right eye view; and
    bringing the plurality of substantially corresponding points together by morphing the left eye view and the right eye view together proximate an edge of at least one of the left eye view and the right eye view based upon the plurality of substantially corresponding points while simultaneously refraining from substantially shifting left eye view main portion content and right eye view main portion content;
    wherein said bringing together reduces parallax effects of the stereo pair toward zero parallax at the edge; and
    wherein said refraining from shifting leaves the parallax values of said left eye view main portion content and right eye view main portion content substantially unchanged.

8. The method of claim 7 wherein morphing the left eye view and the right eye view together comprises morphing the left eye view into the right eye view.

9. The method of claim 7 wherein morphing the left eye view and the right eye view together comprises morphing the right eye view into the left eye view.

10. The method of claim 7 wherein said morphing comprises morphing negative parallax scene elements in the left eye view and the right eye view.

11. The method of claim 7 wherein said identifying a plurality of substantially corresponding points comprises identifying such points within defined regions in the left eye view and the right eye view.

12. The method of claim 11 wherein the defined regions comprise regions toward at least one edge of the left eye view and right eye view.

13. The method of claim 6 wherein the morphing is non-linear and more morphing occurs toward at least one edge of the left eye view and the right eye view than away from at least one edge of the left eye view and the right eye view.

14. The method of claim 10 wherein the morphing is non-linear and less morphing is applied at an inner portion of at least one defined region than at an outer portion of the at least one defined region.

15. The method of claim 7 wherein said morphing is linear.

16. A method of providing enhanced stereoscopic image viewing, comprising:
    providing a stereo pair comprising a right eye view and a left eye view, the stereo pair being operable to be viewed on a display;
    identifying at least one edge portion of the right eye view proximate to an edge of the right eye view;
    identifying at least one edge portion of the left eye view proximate to an edge of the left eye view; and
    cross fading the at least one edge portion of the right eye view with the at least one edge portion of the left eye view while simultaneously refraining from substantially cross fading left eye view main portion content and right eye view main portion content, wherein said cross fading comprises applying an image blend process using weighted averages of corresponding pixel values in the at least one edge portion of the left eye view and the at least one edge portion of the right eye view;

wherein the cross fading reduces negative parallax values of the at least one edge portions of the left and right eye views toward zero; and wherein the refraining from cross fading leaves the parallax values of said left eye view main portion content and right eye view main portion content substantially unchanged.

17. The method of claim 16, wherein the cross fading comprises spatially cross fade dissolving the right eye view into the left eye view.

18. The method of claim 16, wherein the cross fading comprises spatially cross fade dissolving the left eye view into the right eye view.

19. The method of claim 16, wherein the portion of the left eye view and the portion of the right eye view comprise corresponding edge regions in each respective view.

20. The method of claim 16, wherein the fading causes parallax values in the left eye view and the right eye view of the stereo pair to gradually diminish at a measured rate and reduces negative parallax values toward zero.

* * * * *